(12) United States Patent
Iglesias et al.

(10) Patent No.: US 10,811,930 B2
(45) Date of Patent: Oct. 20, 2020

(54) ELECTRIC MOTOR WITH AIR BAFFLE

(71) Applicant: Nidec Motor Corporation, St. Louis, MO (US)

(72) Inventors: René Cruz Iglesias, Monterrey (MX); Mark S. Amalfitano, St. Louis, MO (US); Eric De La Garza, Monterrey (MX); John H. Hussey, St. Louis, MO (US); Jeffrey S. Sherman, Creve Coeur, MO (US); Fidel Flores Mercado, Monterrey (MX)

(73) Assignee: Nidec Motor Corporation, St. Louis, MO (US)

( * ) Notice: Subject to any disclaimer, the term of this patent is extended or adjusted under 35 U.S.C. 154(b) by 216 days.

(21) Appl. No.: 16/145,739

(22) Filed: Sep. 28, 2018

(65) Prior Publication Data

US 2020/0106327 A1 Apr. 2, 2020

(51) Int. Cl.
*H02K 5/20* (2006.01)
*H02K 1/20* (2006.01)
*H02K 9/06* (2006.01)

(52) U.S. Cl.
CPC ............. *H02K 5/20* (2013.01); *H02K 1/20* (2013.01); *H02K 9/06* (2013.01); *H02K 2205/09* (2013.01)

(58) Field of Classification Search
CPC .. H02K 5/20; H02K 1/20; H02K 9/06; H02K 2205/09
See application file for complete search history.

(56) References Cited

U.S. PATENT DOCUMENTS

2008/0090504 A1* 4/2008 Trautner ................. B24B 23/00
451/359

* cited by examiner

*Primary Examiner* — Mohamad A Musleh
(74) *Attorney, Agent, or Firm* — Hovey Williams LLP

(57) ABSTRACT

An electric motor includes a housing shell, an electrical component, and a baffle for directing airflow to the electrical component. The baffle includes a baffle connection element. The shell includes a shell connection element. Interengagement of the connection elements at least substantially restricts axial shifting of the baffle.

23 Claims, 17 Drawing Sheets

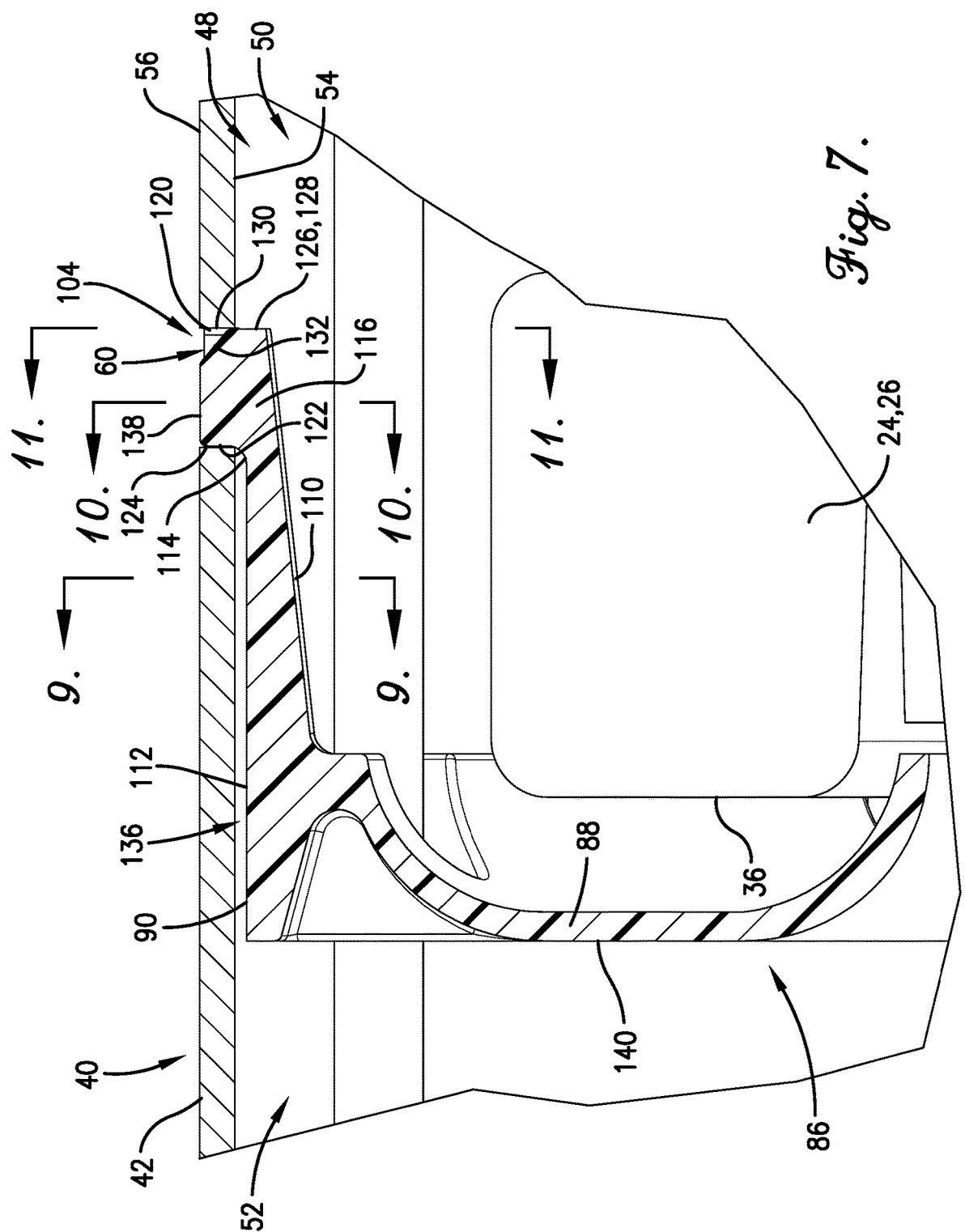

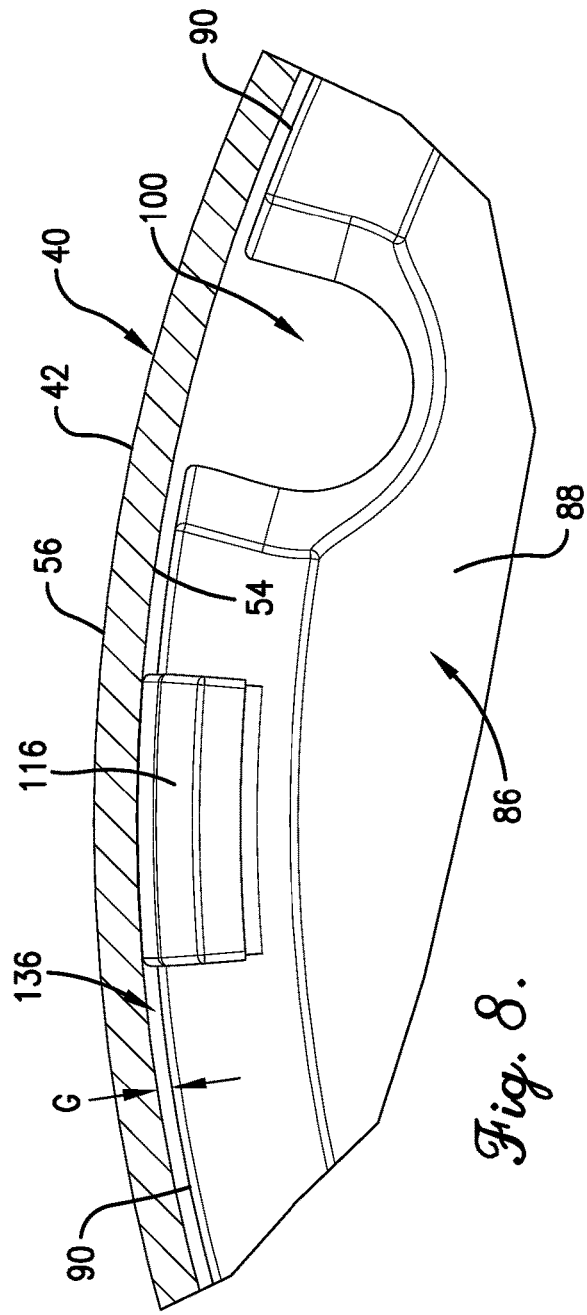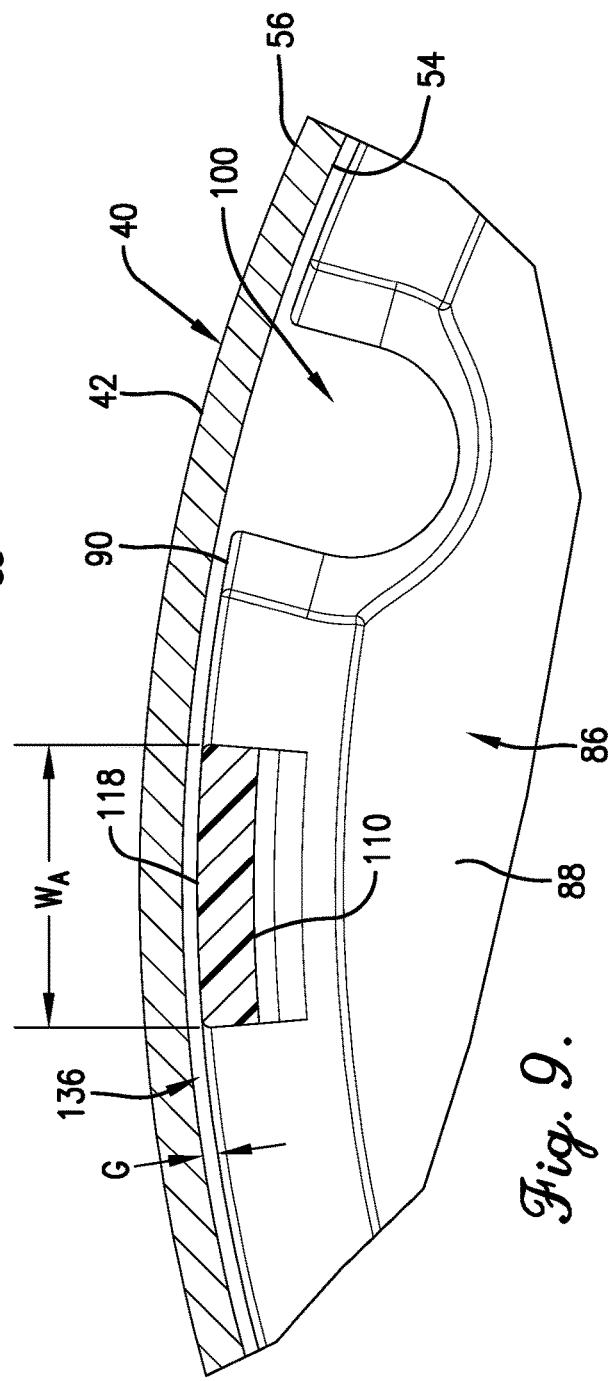

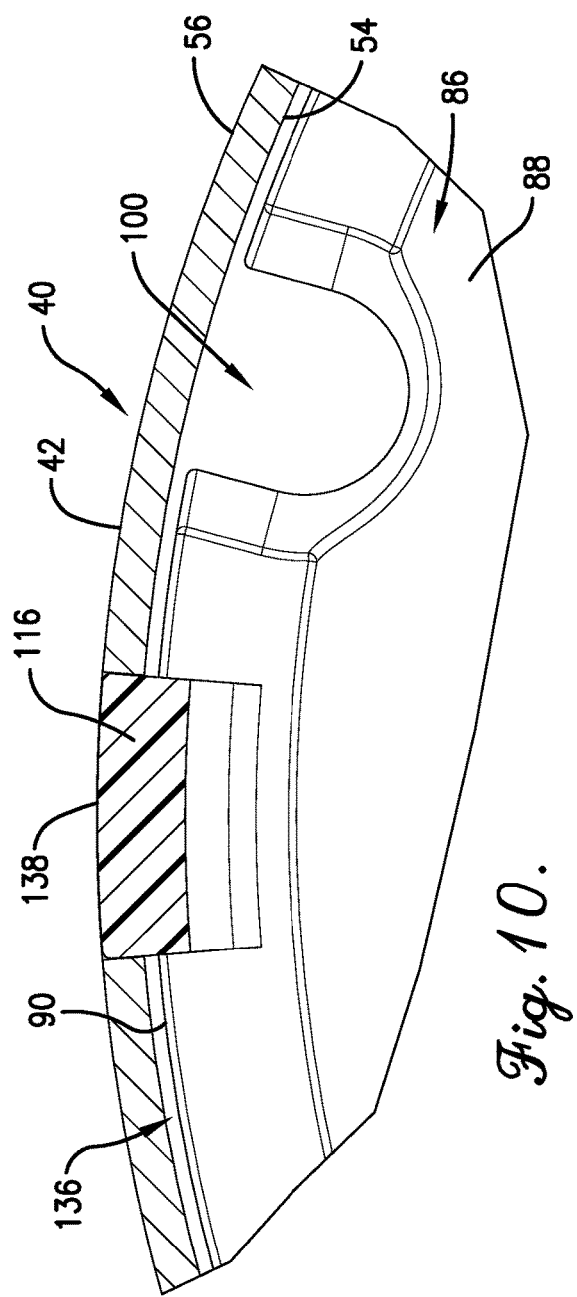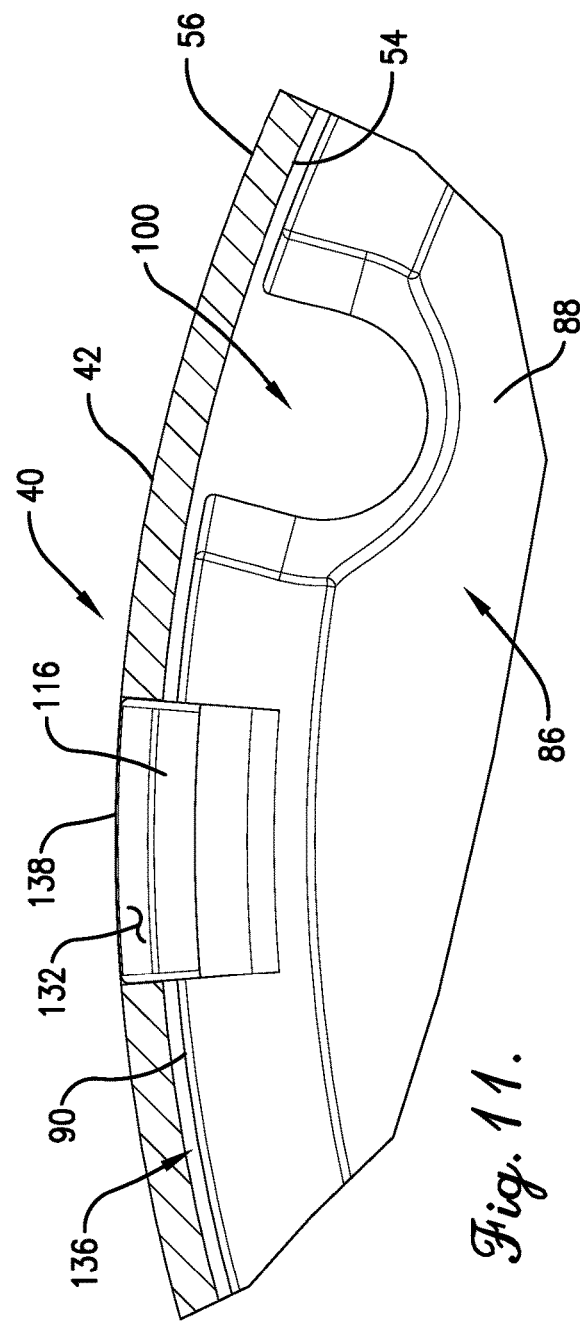

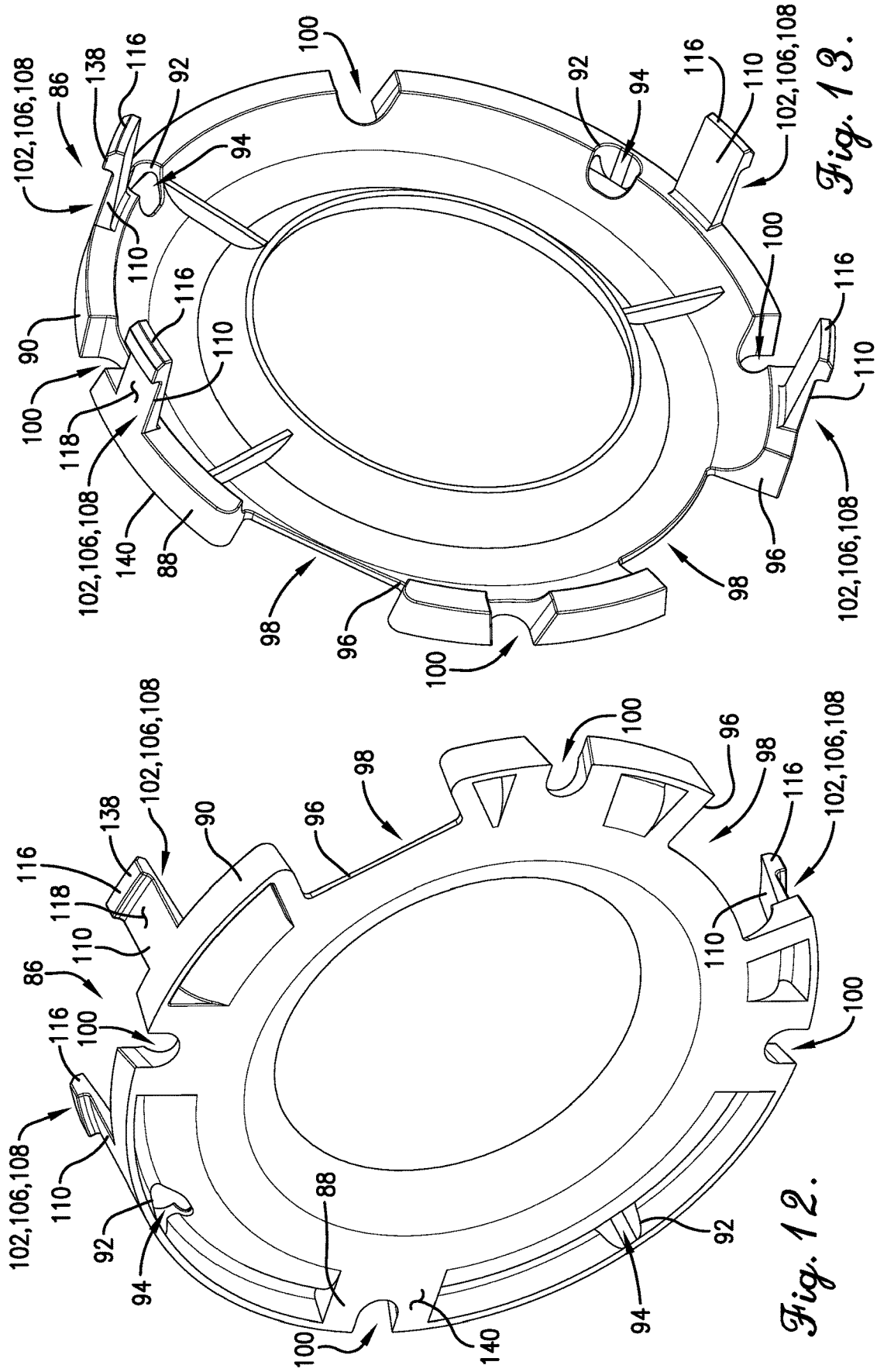

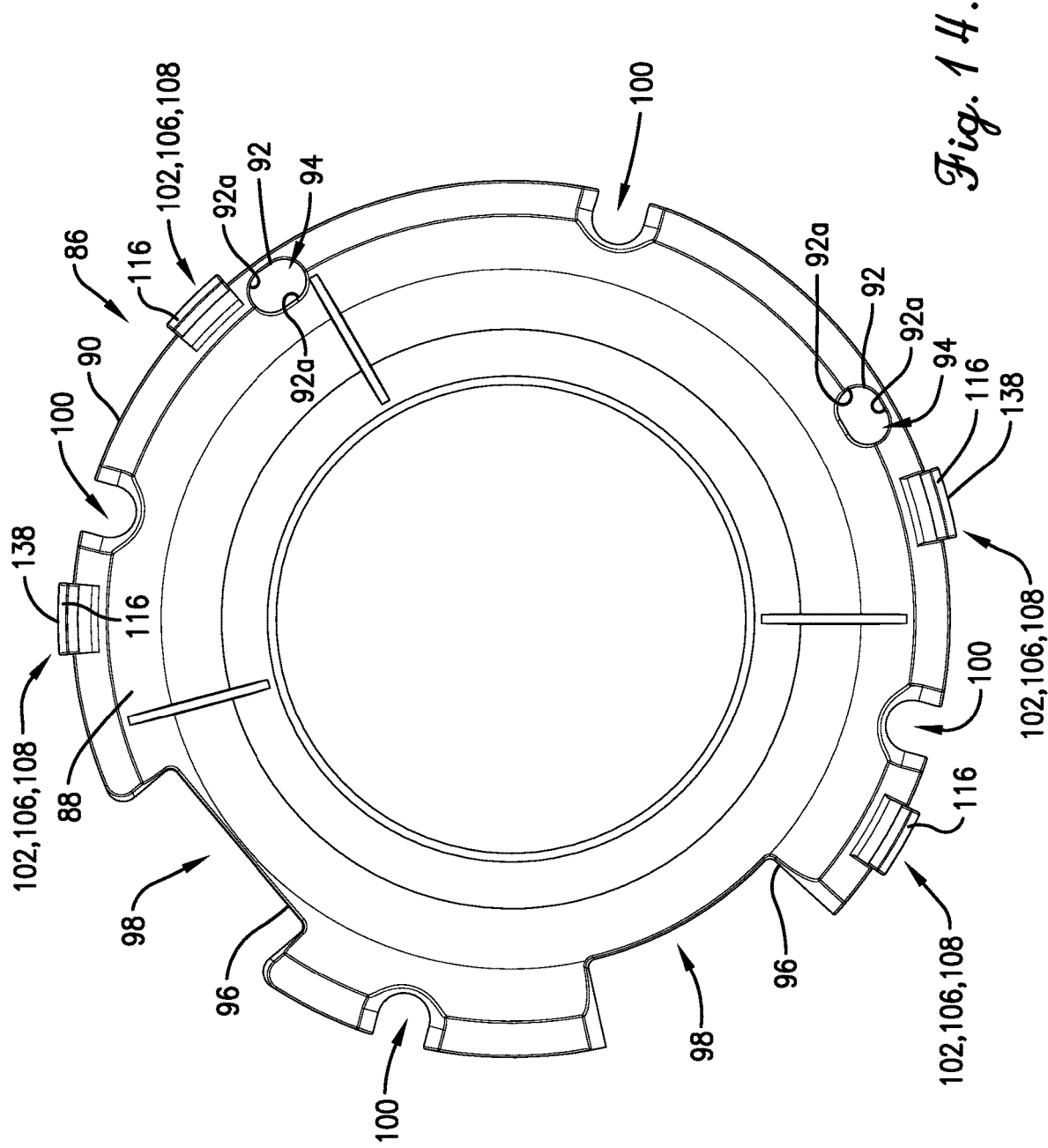

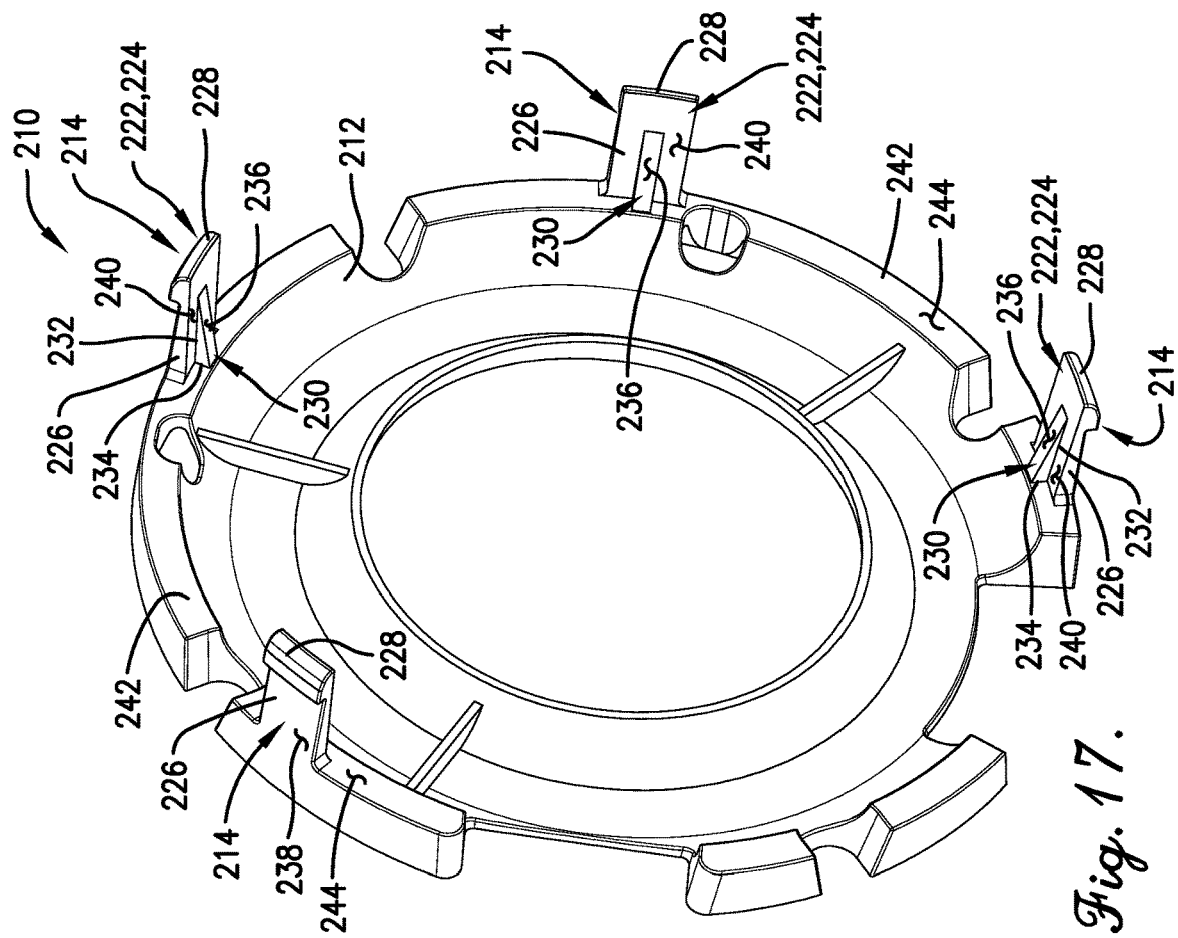

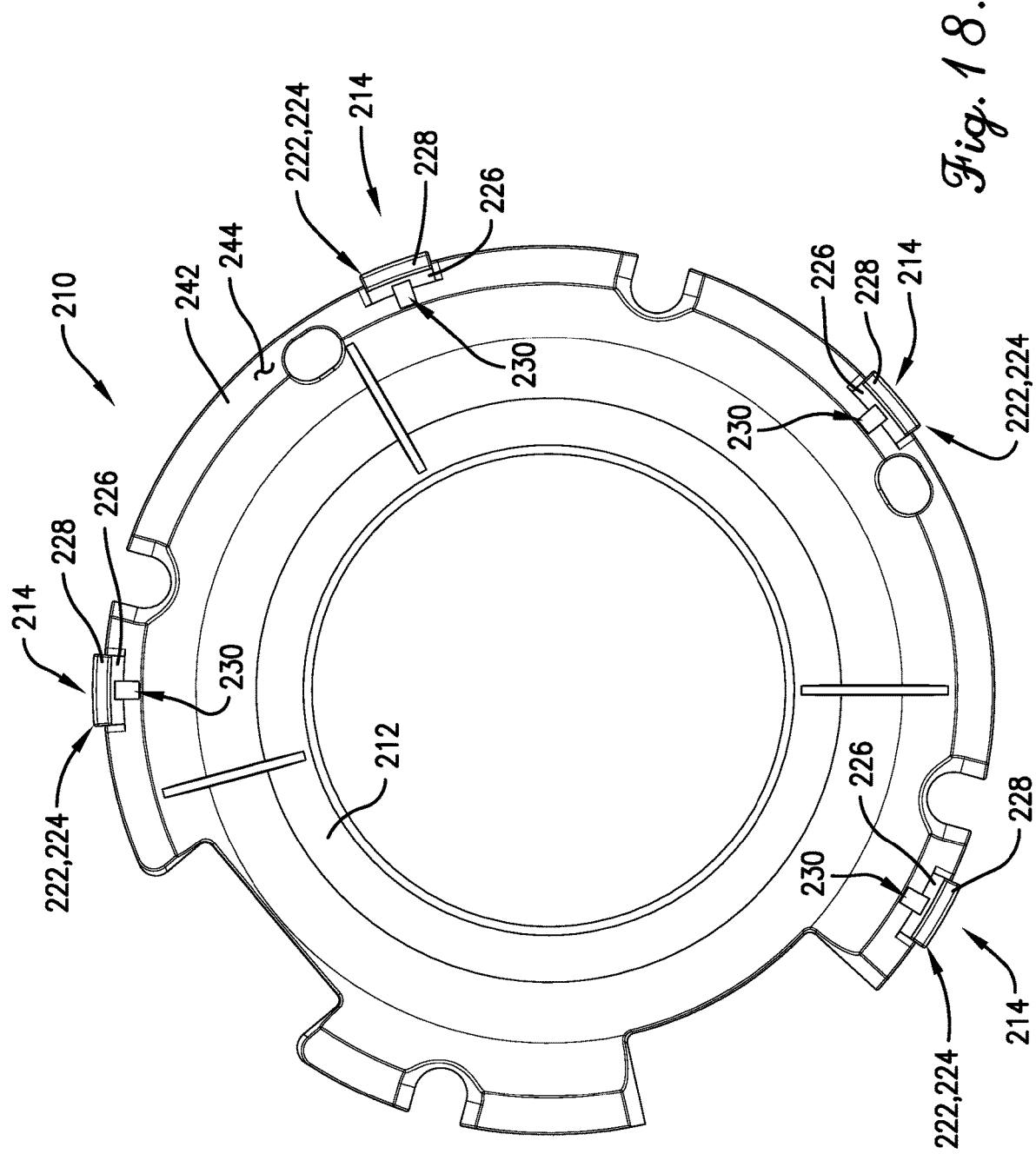

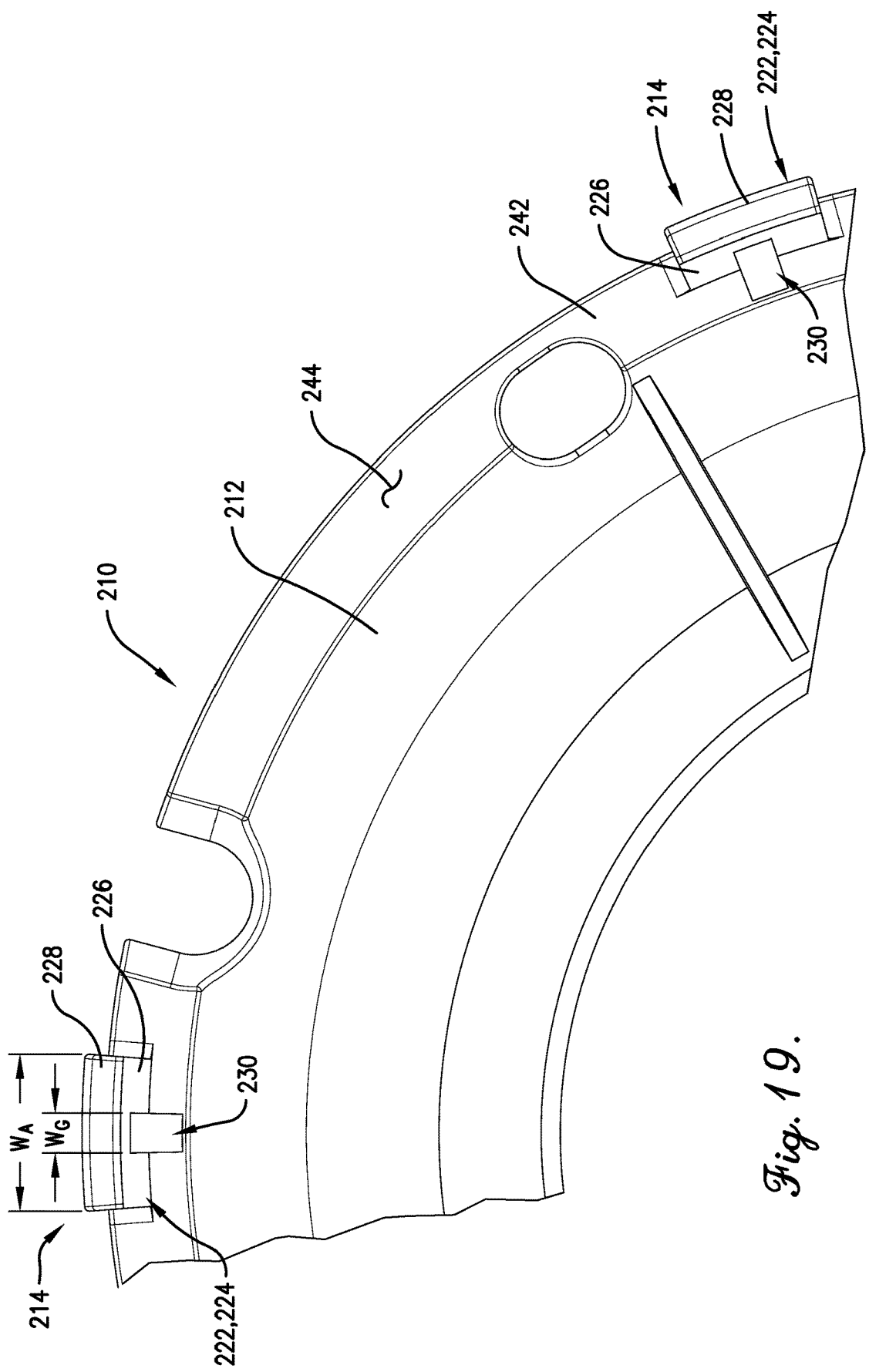

ELECTRIC MOTOR WITH AIR BAFFLE

BACKGROUND OF THE INVENTION

1. Field of the Invention

The present invention relates generally to an electric motor. The motor includes a baffle for directing airflow to electrical components of the motor.

2. Discussion of the Prior Art

Those of ordinary skill in the art will appreciate that electric motors are often used in a variety of applications, including but not limited to vehicles, automated devices, home appliances such as dishwashers and washing machines, exercise equipment, pumps, heating and cooling equipment, and more. In certain applications, cooling of electrical components associated with control of the motor is desirable. A baffle may be provided to direct air to the electrical components to provide such cooling.

SUMMARY

According to one aspect of the present invention, a motor is provided for use in a machine. The motor comprises a rotor rotatable about an axis, a stator including a core presenting axially opposite first and second core ends, an electrical component for controlling at least one aspect of motor operation, and a housing including a shell at least substantially circumscribing the stator. The shell presents first and second axial shell margins corresponding to the first and second core ends. The first core end is disposed between the shell margins. The motor further comprises a baffle including a generally radially extending, plate-like body and a baffle connection element. The baffle includes air-directing structure directing air toward the electrical component. The body is disposed between the first core end and the first shell margin. The body is disposed between the first core end and the electrical component. The shell includes a shell connection element. Interengagement of the connection elements at least substantially restricts axial shifting of the body toward the first shell margin.

BRIEF DESCRIPTION OF THE DRAWING FIGURES

Preferred embodiments of the present invention are described in detail below with reference to the attached drawing figures, wherein:

FIG. 7 is an enlarged cross-sectional view of a portion of the motor of FIGS. 1-6, particularly illustrating final disposition of the baffle within the inner chamber and consequent engagement of one of the positioners and the corresponding openings;

FIG. 8 is an enlarged cross-sectional end view taken along line 8-8 of FIG. 6, particularly illustrating engagement of the shell and a deflected one of the positioners during insertion of the baffle;

FIG. 9 is an enlarged cross-sectional end view taken along line 9-9 of FIG. 7, particularly illustrating the arm geometry of one of the positioners after insertion of the baffle is complete;

FIG. 10 is an enlarged cross-sectional end view taken along line 10-10 of FIG. 7, particularly illustrating the relationship between the head one of the positioners and the corresponding opening after insertion of the baffle is complete;

FIG. 11 is an enlarged cross-sectional end view taken along line 11-11 of FIG. 7, further illustrating the relationship between the head of one of the positioners and the corresponding opening after insertion of the baffle is complete;

FIG. 12 is an enlarged front perspective view of the baffle of the motor of FIGS. 1-11;

FIG. 13 is a rear perspective view of the baffle as shown in FIG. 12;

FIG. 14 is an end view of the baffle of FIGS. 12 and 13, from a rearward perspective;

FIG. 16 is an enlarged font perspective view of a baffle in accordance with a second preferred embodiment of the present invention;

FIG. 17 is a rear perspective view of the baffle as shown in FIG. 16, particularly illustrating reinforcing gussets provided on the positioner arms;

FIG. 18 is an end view of the baffle of FIGS. 16 and 17, from a rearward perspective;

FIG. 19 is an enlarged view of a portion of the baffle as shown in FIG. 14.

Figure 1:
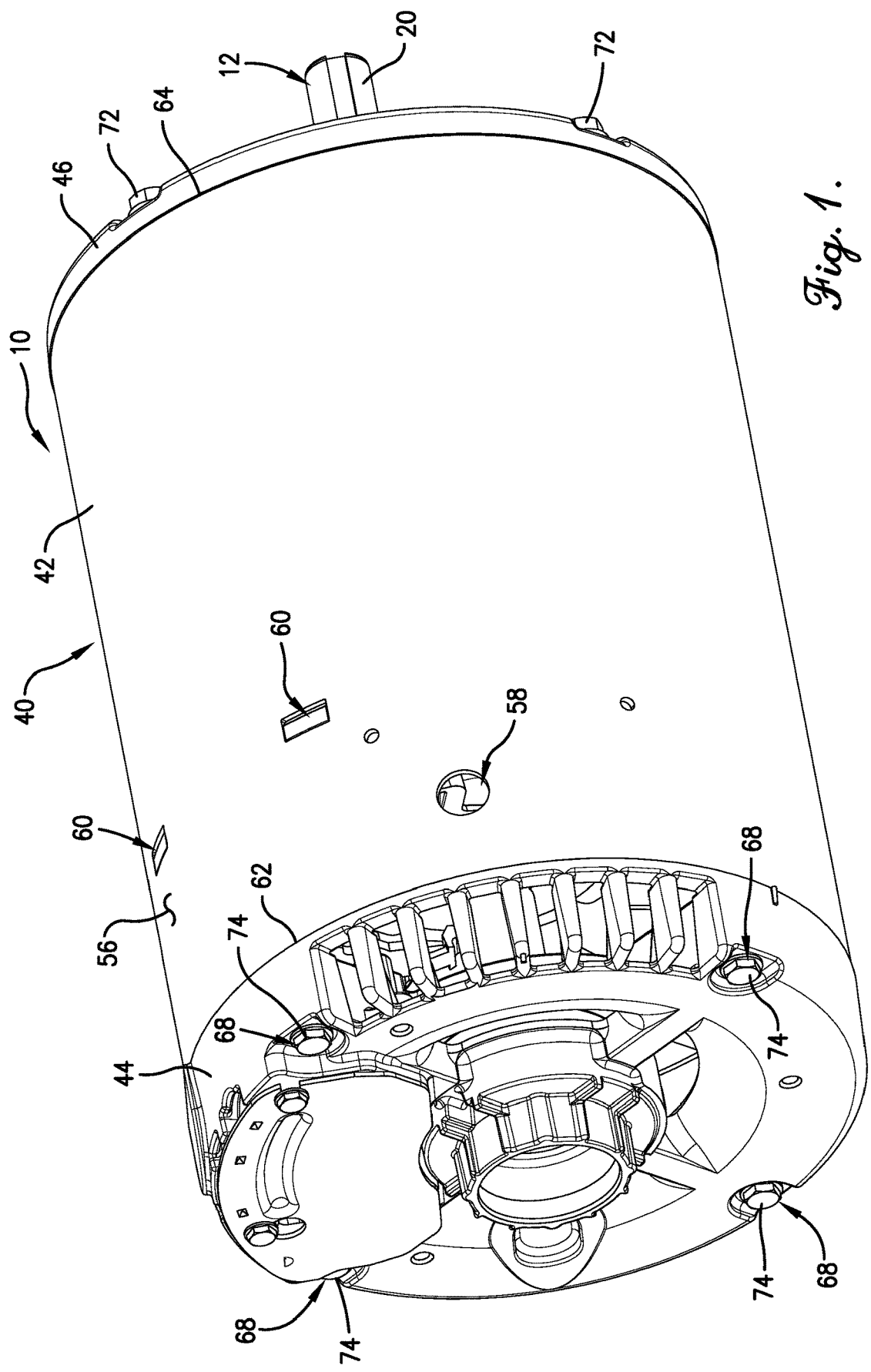
FIG. 1 is a front perspective view of a motor in accordance with a preferred embodiment of the present invention.
Figure 2:
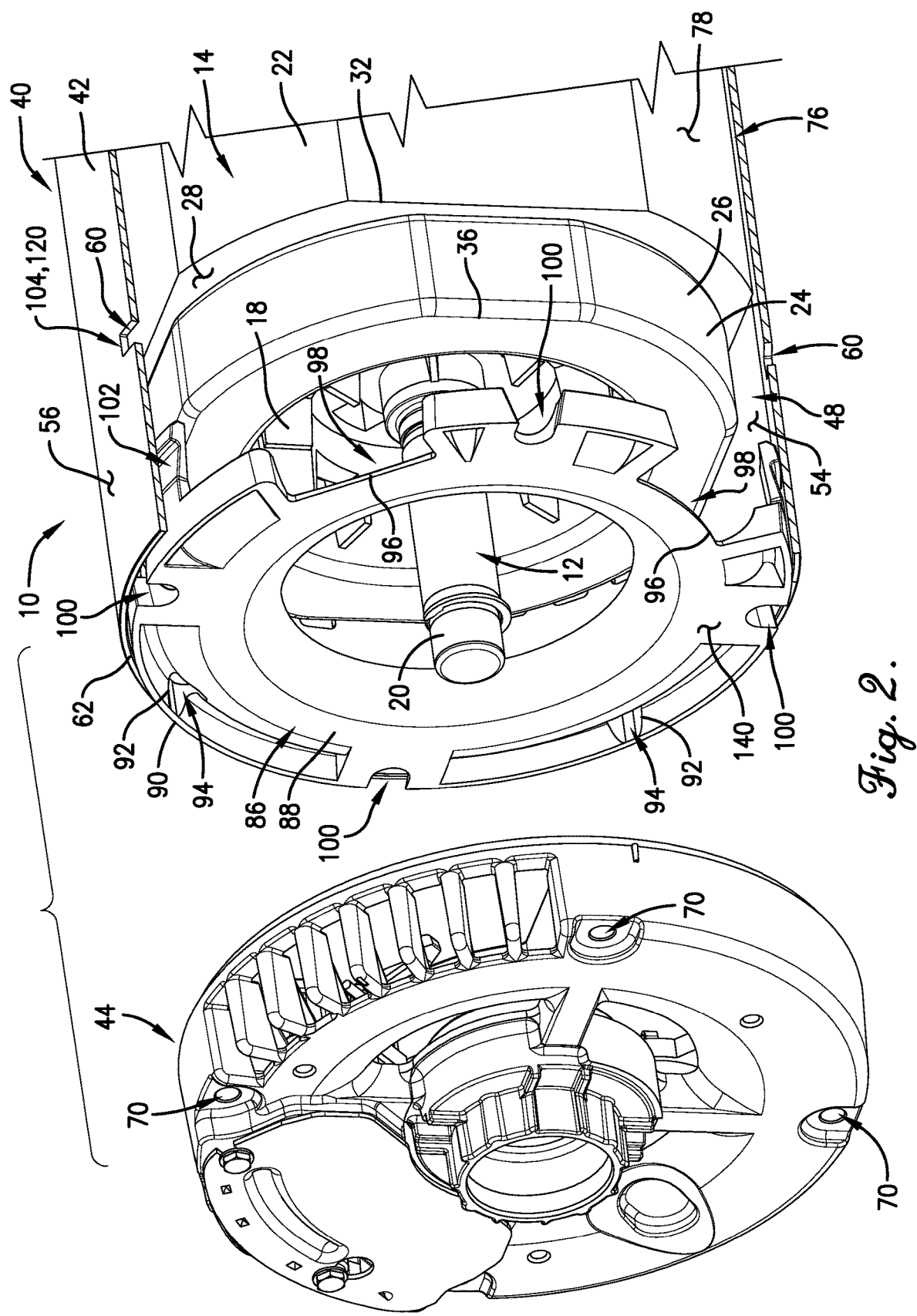
FIG. 2 is a partially exploded front perspective view of a portion of the motor of FIG. 1, particularly illustrating the baffle partially inserted into the inner chamber.
Figure 3:
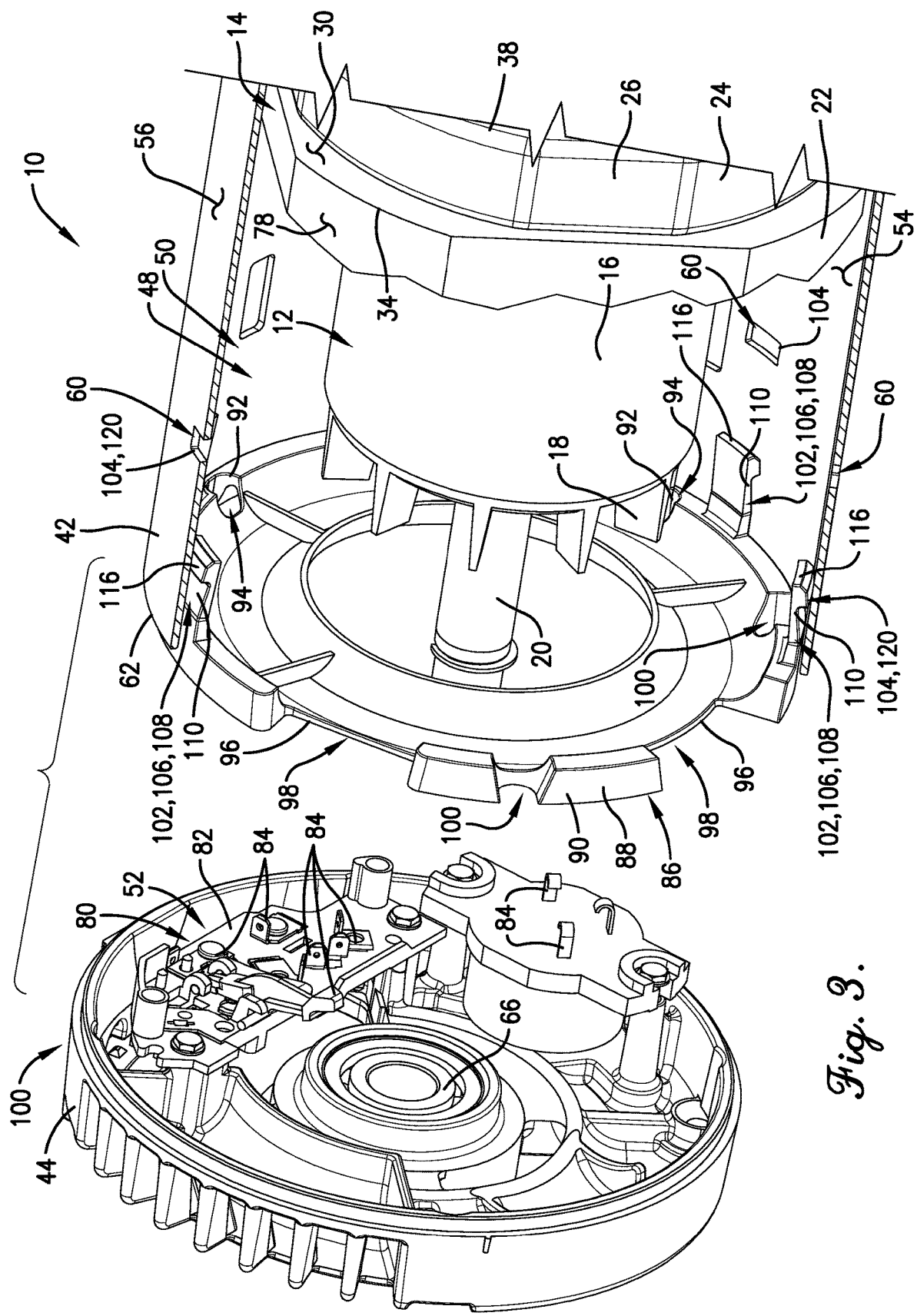
FIG. 3 is an exploded rear perspective view of the portion of the motor shown in FIG. 2.
Figure 4:
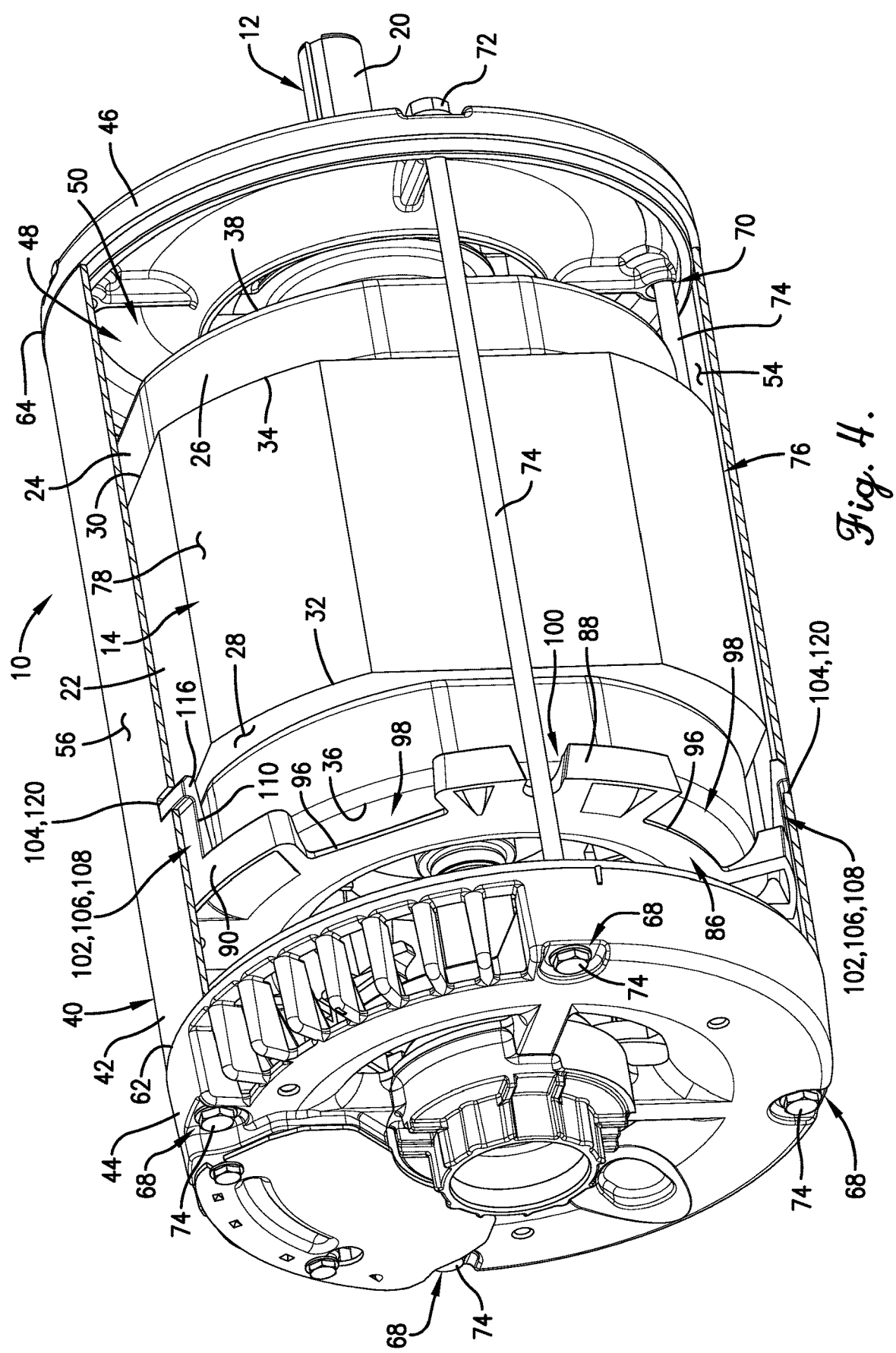
FIG. 4 is a partially sectioned front perspective view of the motor of FIGS. 1-3, particularly illustrating the final disposition of the baffle and the function of the fasteners for securing the stator.
Figure 5:
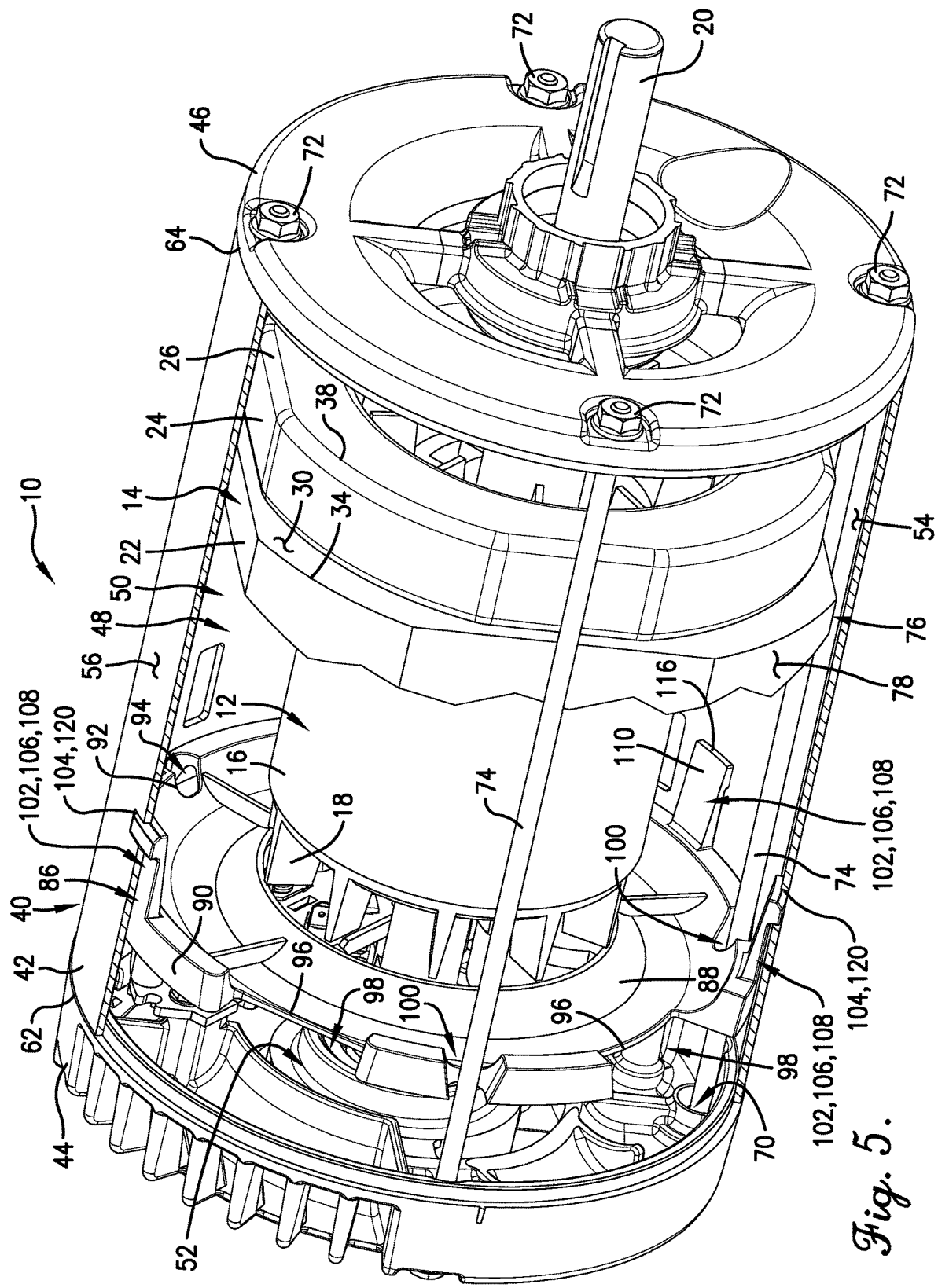
FIG. 5 is a rear perspective view of the motor as shown in FIG. 4.
Figure 6:
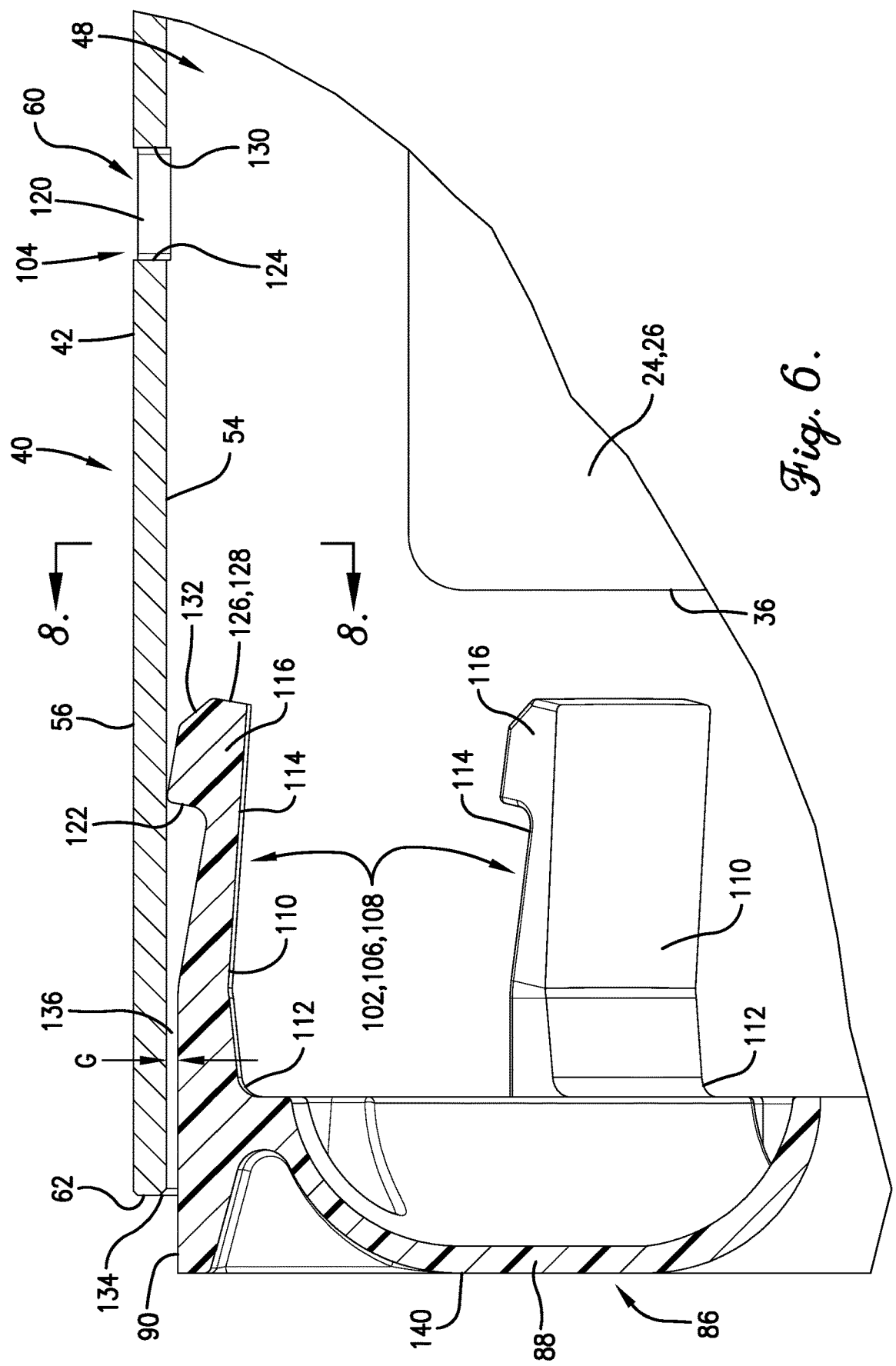
FIG. 6 is an enlarged cross-sectional side view of a portion of the motor of FIGS. 1-5, particularly illustrating partial insertion of the baffle into the inner chamber and consequent deflection of the positioners.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer etc.) are used solely for the sake of convenience and should be understood only in relation to each other. For instance, a component might in practice be oriented such that faces referred to as "top" and "bottom" are sideways, angled, inverted, etc. relative to the chosen frame of reference.

With initial reference to FIGS. 1-5, an electric motor 10 is provided. The motor 10 is preferably for use in any one or more of a variety of applications, including but not limited to belt drive fans and blowers, capacitor-start motors, evaporative coolers, condensers, pumps, and other moisture-containing environments.

The motor 10 broadly includes a rotor 12 and a stator 14. The rotor 12 is rotatable about an axis. In a preferred embodiment, as shown, the stator 14 at least substantially circumscribes the rotor 12, such that the motor 10 is an inner rotor motor. It is permissible according to some aspects of the present invention, however, for the motor to be an outer rotor motor or a dual rotor motor.

The rotor 12 is preferably configured in keeping with the preferred motor type. For instance, the rotor in one configuration might include a core made of steel or another electrically conductive material and a plurality of arcuately arranged permanent magnets (e.g. ferrite or neodymium) fixed to the core. In another, as illustrated, the rotor 12 might be a wound rotor including a rotor core 16 and a plurality of conductors (not shown) extending through the rotor core 16. The core might be laminated or non-laminated, arcuately segmented or uniform, etc. in keeping with the preferred overall motor design.

The illustrated rotor 12 includes a pair of axially spaced apart fans 18 mounted to opposite ends of the rotor core (not shown) to aid in motor cooling. Such fans may be removed without departing from some aspects of the present invention.

The rotor 12 also includes a shaft 20 rotatable about an axis.

The stator 14 preferably includes a stator core 22 and a plurality of coils 24 wound about the stator core 22. The coils 24 comprise electrically conductive wiring 26. The stator core 22, coils 24, and wiring 26 are illustrated only schematically herein. However, it will be readily understood by those of ordinary skill in the art that numerous configurations of the core and coils are suitable in conjunction with the present invention.

For instance, the stator core might be a uniform body, comprise a plurality of interconnected arcuate segments, be formed of axially stacked laminations, etc. The stator core 22 is preferably generally toroidal in form and includes a yoke and a plurality of arcuately spaced apart teeth extending generally radially from the yoke. Preferably, in keeping with the preferred inner rotor motor design, the teeth extend radially inwardly from the yoke, although it is permissible according to some aspects of the present invention for the teeth to extend generally outwardly (e.g., in the case of an outer rotor motor). However, other stator core designs are permissible according to some aspects of the present invention. Various tooth designs are permissible, as well.

The stator core might be insulated or uninsulated. In the former instance, a variety of insulation techniques might be suitable. For instance, a covering might be provided that comprises an at least substantially electrically insulative material such as a synthetic resin material. However, any one or more of a variety of substantially electrically insulative materials may be used without departing from the scope of the present invention. The covering might be in a form including but not limited to electrically insulative overmolding, powder-coating, inserts, and/or liners.

As noted previously, the coils 24 preferably comprise electrically conductive wiring 26 wound about the stator core 22. The wiring 26 is preferably wound about each of the teeth (not shown) through slots therebetween (not shown) to form the coils 24, with each of the coils 24 corresponding to one of the teeth. However, numerous alternatives are permissible. The coils might be concentrically wound, as described above, wave wound, etc. The motor might be single-speed, multi-speed, variable-speed, etc. Auxiliary windings may or may not be present. The wires might be coated or uncoated and comprise any suitable electrically conductive material, including but not limited to aluminum or copper. The motor might be wound to be a three-phase motor, or alternate phasing might be preferred.

The stator core 22 preferably comprises steel, although alternate materials may be used without departing from the scope of the present invention.

The stator core 22 preferably presents a pair of opposite, axially spaced apart end faces 28 and 30 defining corresponding axial ends 32 and 34 of the stator core 22. The end faces 28 and 30 are preferably at least substantially planar and parallel with each other, although non-parallel and/or non-planar surfaces are permissible according to some aspects of the present invention.

The coils 24 preferably extend beyond the axial ends 32 and 34 of the stator core 22 defined by the end faces 28 and 30 to define axially outermost stator margins 36 and 38.

The motor 10 further preferably includes a housing 40. The housing 40 preferably includes a shell 42, a front endshield 44, and a rear endshield 46. The shell 42 and the front and rear endshields 44 and 46, respectively, preferably cooperatively present an inner chamber 48. As will be discussed in greater detail below, the inner chamber 48 preferably includes a motor chamber 50 and an electronics chamber 52. The motor chamber 50 at least substantially receives the stator 14 and the rotor 12.

In a preferred embodiment, the shell 42 extends generally circumferentially about the stator 14. It is permissible according to some aspects of the present invention, however, for the shell to extend in such a manner as to provide one or more flat sides, in contrast to the preferred generally cylindrical form, or to be otherwise alternatively shaped. The shell 42 preferably presents a circumferential inner face 54 defining an inner shell diameter and a circumferential outer face 56 defining an outer shell diameter.

The shell 42 preferably extends generally continuously. However, as will be discussed in greater detail below, the shell 42 preferably includes a plurality of openings or slots therethrough. For instance, openings or slots may provided for ventilation and/or access purposes. In the present embodiment, a portal 58 is provided for extension of electrical leads therethrough. Openings 60 will be described in greater detail below.

The shell 42 preferably presents first and second axial shell margins 62 and 64 corresponding to said first and second core ends 32 and 34 and, in turn, the first and second stator margins 36 and 38. More particularly, the first and second core ends 32 and 34 are preferably disposed axially between the shell margins 62 and 64. Similarly, the first and second stator margins 36 and 38 are preferably disposed between the shell margins 62 and 64. Alternatively stated, the shell 42 preferably extends axially past both axially outermost margins 36 and 38 of the stator 14.

The front and rear endshields 44 and 46 preferably support respective front and back bearing assemblies 66 (only the front bearing assembly 66 being shown) that rotatably support the rotor shaft 20. Alternative or additional bearing assembly supports or shaft supports may be provided without departing from the scope of the present invention, however.

The front and rear endshields 44 and 46 are preferably secured relative to the shell 42. More particularly, a plurality of fasteners 68 extend through respective openings 70 in the endshields 44 and 46 and axially alongside the stator core 22. The fasteners 68 as illustrated comprise nuts 72 and bolts 74, although other means of securing the endshields to the shell (e.g., latches, adhesives, screws, welds, etc.) are permissible without departing from the scope of the present invention.

In keeping with the above, the shell 42 is preferably sized such that a circumferential gap 76 is formed between an outer face 78 of the stator core 22 and the inner face 54 of the shell 42. Alternative relative sizing is permissible according to some aspects of the present invention, however.

In a preferred embodiment, the housing 40 comprises metal. However, material selections may vary widely without departing from the scope of the present invention.

The motor 10 further includes an electronics assembly 80 for controlling at least one aspect of motor operation. In a preferred embodiment, for instance, the electronics assembly 80 includes a printed circuit board or support structure 82 and a plurality of electrical components 84, at least some of which are mounted to the structure 82, for controlling the motor 10. A variety of electrical components 84 may be provided, including but not limited to switches, capacitors, sensors, transformers, filters, encoders, transistors, resistors, timers, sensors, etc.

As will be discussed in greater detail below, the electronics assembly 80 is preferably at least substantially received in the electronics chamber 52.

In a preferred embodiment, the electronics assembly 80 is mounted to the front endshield 44, with the front endshield 44 at least partly defining the electronics chamber 52.

In a preferred embodiment, the motor 10 includes a baffle 86. The baffle 86 preferably comprises a generally radially extending, plate-like or disc-like body 88. The body 88 is preferably generally circular in form to present an outer margin 90 defining an outer body diameter.

As discussed in greater detail below, the baffle 86 is preferably inserted into the inner chamber 48 so as to be positioned axially between the first core end 32 and the first shell margin 62. The baffle 86 is likewise preferably thereby positioned axially between the first core end 32 and the electronics assembly 80.

The baffle 86 preferably cooperates with the shell 42 and the rear endshield 46 to define the motor chamber 50. The baffle 86 preferably cooperates with front endshield 44 to define the electronics chamber 52. That is, the baffle 86 preferably acts as a divider within the inner chamber 48, dividing the inner chamber 48 into the motor chamber 50 and the electronics chamber 52.

In a preferred embodiment, the baffle 86 includes air-directing structure 92 directing air toward the electronics assembly 80 and, more particularly, the electrical components 84 thereof. Such air preferably aids in cooling of the electronics assembly 80.

In a preferred embodiment, the air is driven by the first rotor fan 18. However, alternative air sources (e.g., independent fans, naturally existing airflow, etc.) may be used without departing from the scope of the present invention.

In a preferred embodiment, the air-directing structure 92 comprises a pair of arcuately spaced apart airflow vents 94 disposed near the radially outermost margin 90 of the body 88. The vents 94 are preferably positioned to optimize airflow onto the electrical components 84. Any one of a variety of arrangements may be suitable, however, with optimal arrangements being based on factors including but not limited to the positions of the electrical components 84 and the heat generated by individual ones of said electrical components 84.

In a preferred embodiment, the vents 94 are in the form of generally oval or racetrack-like cylinders (i.e., axially extending and having an oval or racetrack cross-sectional shape). That is, the air-directing structure 92 comprises generally axially extending sidewalls 92a formed by the body 88 and defining the aforementioned shape. However, variations in shape and/or orientation are permissible. For instance, the vents might extend at an angle or even generally radially, or they might have an alternative cross-sectional shape (e.g., circular, rectangular, slit-like with any aforementioned cross-sectional shape, etc.) The vents might also vary in shape from one another and/or vary in shape and/or size along the extent thereof. For instance, the vents might be generally frustoconical.

The vents 94 as illustrated are only slightly radially spaced from the margin 90 of the body 88, as noted above. However, one or more of the vents might instead extend directly from the margin or instead be disposed well inward of the margin 90. As notes above, however, it is most preferred that the vents, wherever they may be positioned and however they may be oriented or shaped, direct air in such a manner as to provide cooling of the relevant electronics.

It is also noted that vents defined in entirely different manners are permissible according to some aspects of the present invention. For instance, the baffle might be provided with protrusions (e.g., tubular or blade-like structures) that extend from the body and further define the vents.

The baffle 86 further preferably includes a pair of wire-routing structures 96 defining respective gaps 98 for generally axial passage of wiring 26 therethrough (e.g., from the electronics chamber 52 into the motor chamber 50 and vice versa). More particularly, in a preferred embodiment, as illustrated, a pair of notch-like gaps 98 extend radially inwardly from the outermost margin 90 of the body 88. Other pass-through openings (sealed or unsealed) may alternatively or additionally be provided. Such pass-through openings might be provided along the circumference of the baffle, as shown, and/or positioned inwardly from the outermost margin of the body. Such openings may also be of any of a variety of shapes, including quadrangular (as shown), circular, oval, etc.

The baffle 86 also further preferably includes a plurality of notches 100 through which the fasteners 68 for securing the stator 14 extend. As illustrated, such notches 100 preferably extend from the outermost margin 90 of the body 88, although other positioning (e.g., in keeping with alternative fastener positioning) is permissible.

The baffle 86 preferably includes a plurality of arcuately spaced apart baffle connection elements 102. The shell 42 preferably includes a plurality of shell connection elements 104 corresponding to the baffle connection elements 102. Interengagement of the baffle connection elements 102 and the shell connection elements 104 at least substantially restricts axial shifting of the body 88 relative to the shell 42.

More particularly, in a preferred embodiment, each baffle connection element 102 comprises a projecting positioner 106 extending from the baffle body 88. The positioner 106 is most preferably a latch 108 (i.e., a cantilevered snap joint or clip). The latch 108 preferably includes an arm 110 extending from the body 88. The arm 110 preferably presents presenting a proximal end 112 adjacent the body 88 and a distal end 114 spaced generally axially from the body 88. The latch 108 further preferably includes a head 116 extending from the arm 110 adjacent the distal end 114 thereof.

The arm 110 is preferably resiliently deflectable. That is, upon application of sufficient radially inward force, the arm 110 deflects toward the rotor axis and then, upon sufficient decrease or removal of the force, the arm 110 returns to its original generally or complete axial configuration. As will be discussed in greater detail below, the head 116 likewise therefore shifts radially inwardly or outwardly.

The arm 110 is preferably dimensioned to facilitate such deflection. For instance, the arm 110 preferably presents a generally axial arm length $L_A$ and a generally arcuate arm width $W_A$ at least substantially orthogonal to the arm length $L_A$. (The arms 110 each preferably present arcuately curved outer faces 118 complementing the inner face 54 of the shell 42, although flat outer faces are permissible.) The arm width $W_A$ is preferably less than the arm length $L_A$. Furthermore, the arm 110 preferably presents a generally radial arm thickness $T_A$ that decreases from the proximal end 112 to the distal end 114.

More particularly, the arm length $L_A$ is preferably between about five tenths (0.5) inches and about one (1) inches, or most preferably about sixty-six hundredths (0.66) inches. The arm width $W_A$ is preferably between about two tenths (0.2) inches and about six tenths (0.6) inches, or most preferably about four tenths (0.4) inches. The arm thickness $T_A$ at the proximal end is preferably between about five hundredths (0.05) inches and fifteen hundredths (0.15) inches and is most preferably about one tenth (0.1) inches. At the distal end, the arm thickness $T_A$ is preferably between about twenty-five thousandths (0.025) inches and about seventy-five thousandths (0.075) inches and is most preferably about five hundredths (0.05) inches (i.e., half the thickness of the proximal end). Dimensional variations still enabling sufficient deflection and recovery are permissible, however.

Among other things, for instance, the arm thickness might be increased along a portion of or all of the arm length to provide reinforcement to the arm; the arm thickness might vary non-linearly along the arm length or even be invariant; and/or the arm length might increase or decrease over that shown in the illustrated embodiment. It is particularly noted that the variations described above might be made in terms of absolute numerical value relative to those of a preferred embodiment described herein or, alternatively, simply be made in a relative or proportional sense with regard to other components.

The baffle 86 material is also preferably chosen to facilitate the desired deflection. In a preferred embodiment, for instance, the baffle 86 comprises a synthetic resin or plastic.

In a preferred embodiment, each shell connection element 104 comprises a receiver 120 defined by the shell 42 and configured to receive at least part of the corresponding positioner or, more particularly, at least part of the head 116 of the corresponding latch 108. In greater detail, each receiver 120 preferably defines one of the aforementioned openings 60, sized and shaped to receive the corresponding head 116 and engage the head 116 to restrict axial shifting of the baffle 86 relative to the shell 42.

In a preferred embodiment, for instance, each opening 60 is generally rectangular to correspond to the profile of the corresponding head 116. The dimensions of each opening 60 also preferably correspond to those of the corresponding head 116. For instance, each head 116 preferably presents a generally axial head height $H_H$ between about two tenths (0.2) inches and about four tenths (0.4) inches. Most preferably, the head height $H_H$ is about twenty-eight hundredths (0.28) inches. Each head 116 also preferably presents a generally arcuate head width $W_H$ between about three tenths (0.3) inches and about five tenths (0.5) inches, or most preferably, about four hundred and five thousands (0.405) inches. In keeping with the above, each opening 60 preferably presents a generally axial opening height $H_O$ between about two tenths (0.2) inches and about four tenths (0.4) inches. Most preferably, the opening height $H_O$ is about twenty-eight hundredths (0.28) inches. Each opening 60 also preferably presents a generally arcuate opening width $W_O$ between about three tenths (0.3) inches and about five tenths (0.5) inches, or most preferably, about four hundred and five thousands (0.405) inches.

It is noted that the arm length $L_A$ is preferably at least one and one half (1.5) times the head height $H_H$ and more preferably at least twice the head height $H_H$.

It is permissible according to some aspects of the present invention, however, for the opening and head dimensions to vary. Among other things, for instance, the head height and opening height might both be larger or smaller than described above and shown in the figures; and/or the opening height might be larger or smaller than the head height. With regard to the latter, however, it is necessary that the opening be at least large enough to accommodate (i.e., receive) at least part of the head in order to the head to remain functional for restriction of axial shifting (as will be described in greater detail below). Furthermore, shapes may vary between the openings and heads, although axial shifting should nevertheless be at least in part restricted.

It is also particularly noted that the variations described above might be made in terms of absolute numerical value relative to those of a preferred embodiment described herein or, alternatively, simply be made in a relative or proportional sense with regard to other components.

In a preferred embodiment, the aforementioned potential axial shifting is restricted by engagement of corresponding generally radially extending faces of the head 116 and the receiver 120. More particularly, the head 116 preferably includes a generally radially extending catch face 122 adjacent the distal end 114 of the arm 110. The catch face 122 engages a generally radially extending first receiver face 124 when the head 116 is received in the opening 60 to at least substantially restrict or prevent axial shifting of the baffle body 88 toward the first shell margin 62.

The catch face 122 and the first receiver face 124 preferably present at least substantially equal radial thicknesses $T_C$ and $T_R$, respectively, to facilitate secure contact therebetween, although either of such faces may be larger or smaller than the other without departing from the scope of some aspects of the present invention.

It is noted that, as illustrated, the thickness $T_R$ of the first receiver face 124 is equal to the thickness of the shell 42. That is, the first receiver face 124 is simply defined by the shell 42 itself via formation of the opening 60, although such feature might also vary without departing from the scope of the present invention.

The head 116 further preferably includes a generally radially extending distal face 126 spaced from the catch face 122 (the distance therebetween being the head height $H_H$) and defining an axially outermost or distal-most margin 128 of the latch 108. The distal face 126 engages a generally radially extending second receiver face 130 when the head 116 is received in the opening 60 to at least substantially restrict or prevent axial shifting of the baffle body 88 toward the first core end 32.

In a preferred embodiment, the head 116 also includes a guide face 132 oriented obliquely relative to the shell 42. The shell 42 preferably includes a corresponding deflection face 134 oriented obliquely relative to the axis and disposed adjacent the first shell margin 62. The deflection face 134 preferably engages the guide face 132 upon initial insertion of the baffle 86 into the shell 42 to facilitate deflection of the arm 110 (through a caming action) and axial shifting of the baffle 86.

Most preferably, the deflection face 134 and the guide face 132 extend parallel to one another when the corresponding latch 108 is in an undeflected stator. For instance, it is preferred that both the guide face 132 and the deflection face 134 are oriented between about thirty (30) degrees and about fifty (50) degrees from the axis or, most preferably, about forty (40) degrees therefrom. Various configurations of these faces, including varying angles from those described above, are permissible according to some aspects of the present invention, however.

In a preferred embodiment, the baffle 86 is slip-fit or loosely fit into the inner chamber 48. That is, the shell 42 preferably presents an inner shell diameter that is greater than or equal to an outer body diameter presented by the body 88. Most preferably, the inner shell diameter is greater than the outer body diameter such that a gap 136 is defined therebetween. For instance, in a preferred embodiment, a radial gap dimension G between about one hundredth (0.01) inches and about two hundredths (0.02) inches or, most preferably, about fifteen thousandths (0.015) inches is defined. That is, the outer body diameter is most preferably about fifteen thousands (0.015) inches less than the inner shell diameter, enabling resistance-free insertion of the baffle 86 into the shell 42 with the exception of that provided due to contact of the latches 108 with the inner face 54 of the shell 42. In a preferred embodiment, for instance, the outer body diameter is about six and three hundred thousandths (6.300) inches, in contrast to the shell inner diameter of six and three hundred fifteen thousandths (6.315) inches.

Such low contact between the baffle 86 and the shell 42 during assembly is highly advantageous, reducing, eliminating, or at least substantially eliminating stress concentrations associated with conventional press-fit (i.e., interference fit) baffles. That is, securement of the baffle 86 is provided by means of the latches 108 rather than stresses associated with an interference fit between the body and shell.

Figure 7A:
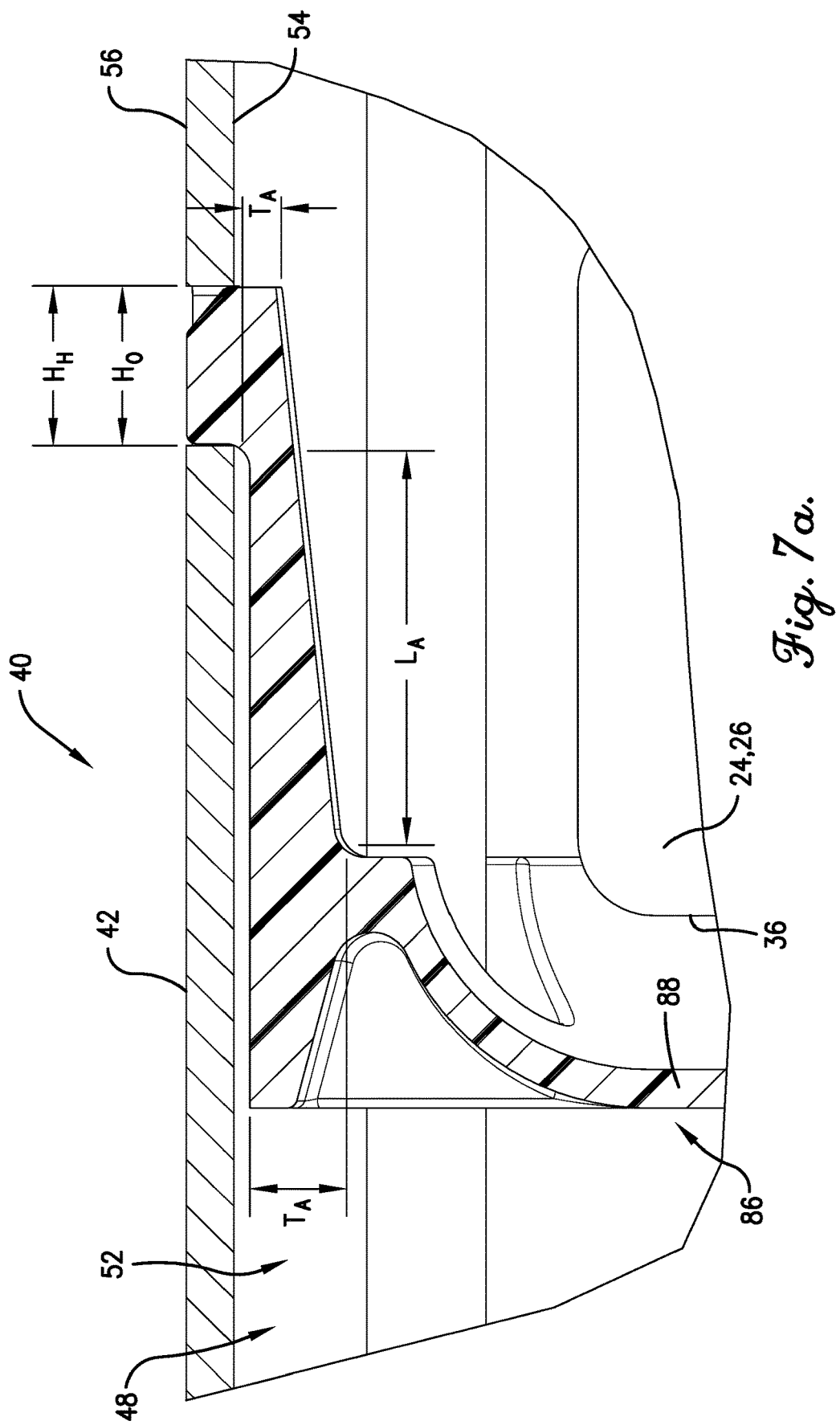
FIG. 7a is a further enlarged cross-sectional side view similar to FIG. 7 and particularly illustrating relevant dimensions of a positioner and corresponding opening.
Figure 15:
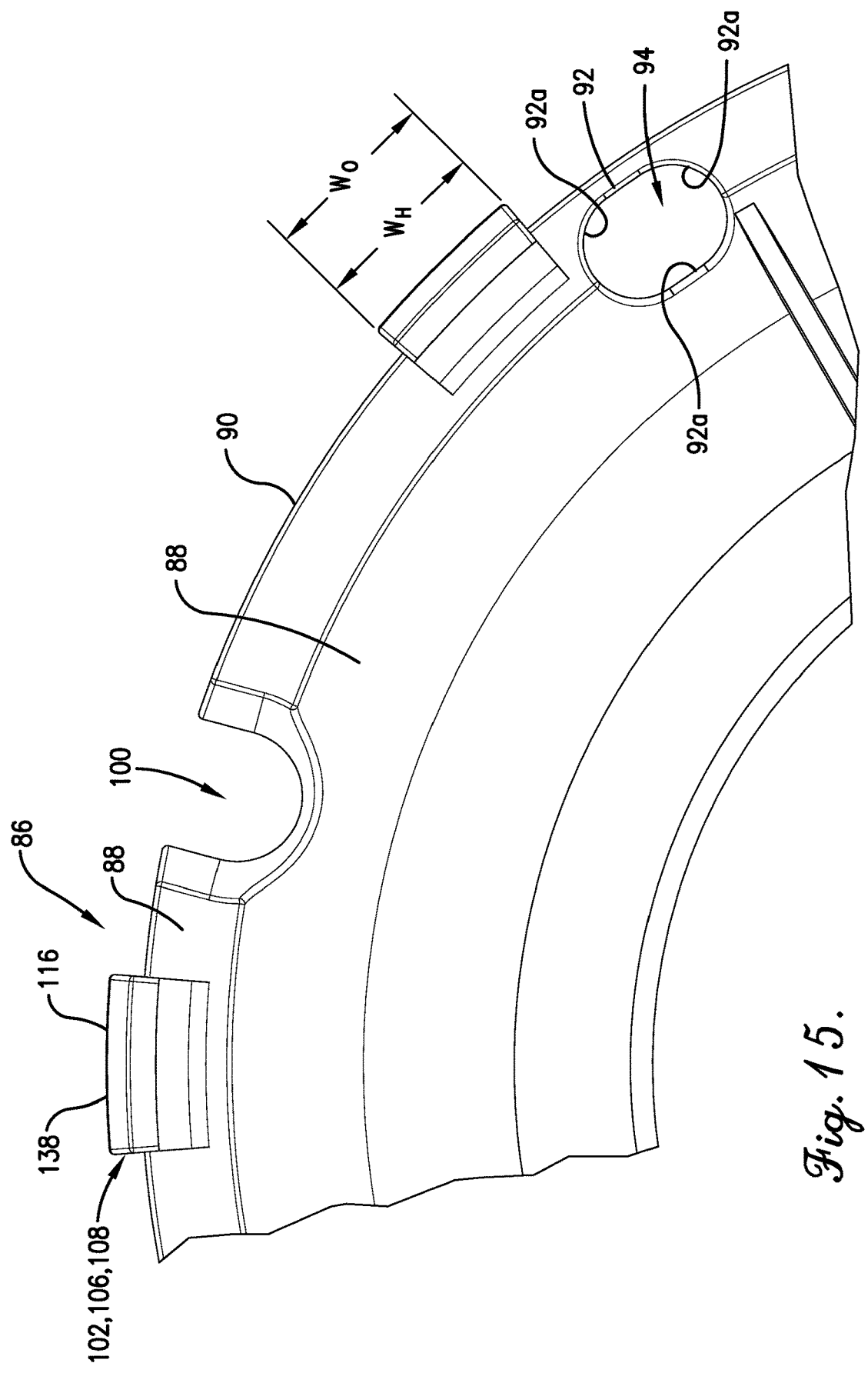
FIG. 15 is an enlarged view of a portion of the baffle as shown in FIG. 14.
Figure 20:
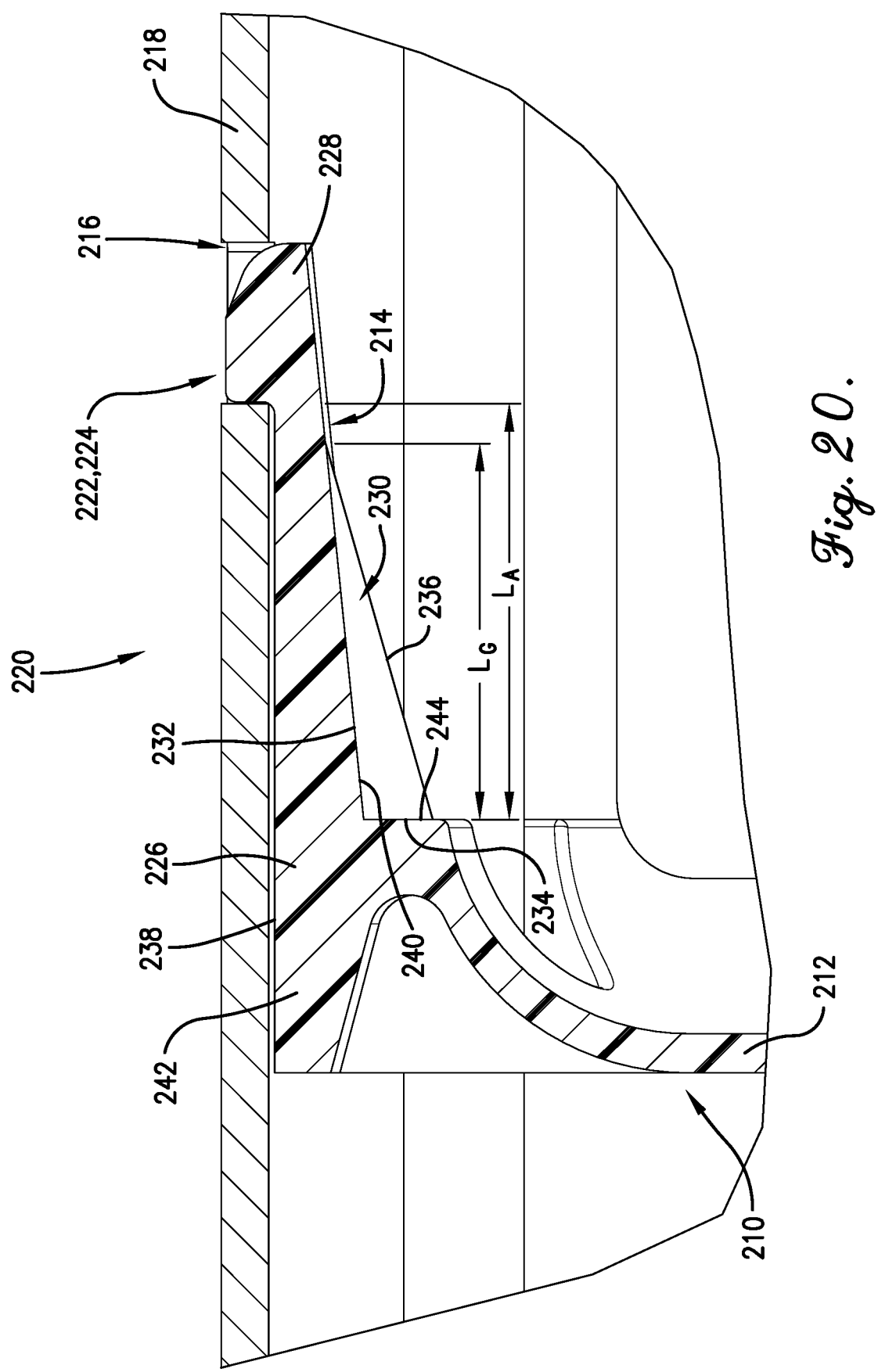
FIG. 20 is an enlarged cross-sectional view of a portion of a motor including the baffle FIGS. 16-19, particularly illustrating final disposition of the baffle within the inner chamber and consequent engagement of one of the positioners and the corresponding openings.

Of course, as will be apparent to those of skill in the art, while the body outer diameter is less than or equal the shell inner diameter, the heads 116 of the latches 108 cooperatively present a radially outermost margin 138 of the baffle 86 as a whole that, in the undeflected or received state, is greater than the outer body diameter. (That is, the radially outermost margin 138 defined by the heads 116 is radially outside the outer margin 90 defined by the body 88.) Furthermore, this overall outermost margin 138 presents an outermost margin diameter that is greater the inner shell diameter and equal to or most preferably only slightly less than the shell outer diameter (see, for instance, FIGS. 7 and 7*a*).

As noted previously, a plurality of the baffle connection elements 102 are preferably provided. Although such elements 102 may be evenly arcuately spaced, uneven spacing is preferred in the illustrated embodiment to facilitate other motor design features. More particularly, in a preferred embodiment, two (2) pairs of baffle connection elements 102 are provided, with a first pair being disposed in a first circumferential half of the baffle and a second pair being disposed in a second circumferential half of the baffle. Most preferably, the pairs are disposed in opposite circumferential quadrants of the baffle yet not diametrically opposed (i.e., the baffle 86 is asymmetrical with respect to positioning of the baffle connection elements 102), with the elements 102 in each pair being spaced about sixty (60) degrees from each other. As will be readily understood of those of ordinary skill in the art, ideal spacing will vary widely depending on other features of the motor design. It is noted, however, that at somewhat broad distribution of connection elements will be preferred to ensure the baffle 86 is both securely held within the shell 42 and does not fall into a skewed orientation (unless such an orientation is intentionally defined via intentionally axially disaligned receivers). In a preferred embodiment, for instance, the arcuate distribution of the baffle connection elements 102 and shell connection elements 104 is such that an axial spacing of between about five tenths (0.5) inches and one and five tenths (1.5) inches or, most preferably, about one and sixty-eight thousandths (1.068) inches, is defined between the first shell margin 62 and an axially outermost face 140 of the baffle body 88.

As noted previously, the above-described design facilitates insertion of the baffle 86 into the shell 42 with minimal stresses applied thereto by engagement with the shell 42. It is likewise possible to insert the baffle 86 with minimal application of axial force. Breakage risk of the baffle 86 is therefore greatly reduced.

The present design also facilitates removal of the baffle 86 via depression (i.e, radially inward shifting) of the latches 108 (e.g., via manual force applied through the openings 60) and subsequent axial pulling of the baffle 86 toward the first shell margin 62.

It is noted that, while the above-described configuration relies on baffle-based latches received in a radially outwardly disposed shell, configurations in which positioners (or latches) are provided by the shell and receivers (or openings) are provided by the baffle, or combination configurations in which both components are provided with both positioners and receivers, are also permissible according to some aspects of the present invention.

Still further, the connection elements (i.e., positioners and receivers) may be configured in structurally different manners than described above. For instance, the positioners and/or receivers might comprise keys and corresponding receivers (e.g. dovetails, ribs, etc. and corresponding receivers or grooves), alternatively shaped latches (e.g., circular cross-sections), shelves or projecting stops, detents, or even springs (including those in the form of a deflectable arm) securing the baffle by use of spring force between the baffle and the shell.

Varying directionality is also permissible. The latches might in certain embodiments deflect radially outwardly, for instance, or include an arm that extends generally radially so as to deflect axially. However, any such variations should nevertheless facilitate securement of the baffle relative to the shell.

A second preferred baffle is illustrated in FIGS. 16-20. It is initially noted that, with certain exceptions to be discussed in detail below, many of the elements of the baffle 210 of the second embodiment are the same as or very similar to those described in detail above in relation to the baffle 86 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the baffle 86, the baffle 210 of the second preferred embodiment preferably includes a body 212 and a plurality of arcuately spaced apart baffle connection elements 214. The baffle connection elements 214 are configured to engage a corresponding plurality of shell connection elements 216 (see FIG. 20) defined by a shell 218, wherein the shell 218 and the baffle 210 are each components of a motor 220.

Each baffle connection element 214 preferably comprises a projecting positioner 222 extending from the baffle body 212. The positioner 222 is most preferably a latch 224 (i.e., a cantilevered snap joint or clip). The latch 224 preferably includes an arm 226 extending from the body 212. The latch 224 further preferably includes a head 228 extending from the arm 226.

Each baffle connection element 214 further preferably includes a reinforcing gusset 230 providing structural support the arm 226. Each gusset 230 is preferably generally triangular in cross-section, with a side face 232, a base face 234, and a hypotenuse face 236.

Each arm 226 preferably presents a radially outermost face 238 and a radially innermost face 240. The side face 232 of the gusset 230 preferably extends along at least a portion of the radially innermost face 240 of the arm 226.

The baffle body 212 preferably presents a rim 242 including a generally radially extending projection face 244. The latches 224 preferably extend from the projection face 244. Still further, the base face 234 of each gusset 230 preferably extends along the projection face 244.

Preferably, each of the latches 224 is strengthened by a gusset 230. However, it is permissible according to some aspects of the present invention for one or more latches to be devoid of a gusset or to include more than one gusset. Gusset design may also vary between arms (i.e., different gusset designs might be used on different arms) and even in association with a single arm (e.g., a single arm might be reinforced by a pair of non-identical gussets).

Although triangularly shaped gussets are preferred, other shapes fall within the scope of the present invention, as well. Regardless of specific shape, however, the gussets should increase the structural integrity of the positioners while still facilitating sufficient deflection of the corresponding arms as necessary for insertion of the baffle into the shell.

The gussets 230 preferably comprise the same material as the remainder of the baffle body 212, but different materials may be used within the scope of the present invention.

As illustrated, the gussets 230 preferably present a generally arcuate gusset width $W_G$ that is less than a generally arcuate arm width $W_A$. For instance, in a preferred embodiment, the gusset width $W_G$ is less than about one half and, more preferably, less than about one third of the corresponding arm width $W_A$. However, other relative dimensioning, including a gusset width that is equal to or even greater than the corresponding arm width, is permissible according to some aspects of the present invention.

The gussets 230 also preferably present an axial gusset length $L_G$ corresponding to an axial arm length $L_A$. The gusset length $L_G$ is most preferably slightly less than the arm length $L_A$. For instance, it is preferred that the gusset length $L_G$ be at least about fifty percent of the arm length $L_A$, more preferably at least about seventy-five percent of the arm length $L_A$, and most preferably at least eighty-five percent of the arm length $L_A$. Shorter gussets or those that extend beyond the arm (e.g., onto the corresponding head 228 or therebeyond) fall within the scope of some aspects of the present invention, however.

It is permissible according to some aspects of the present invention for the gussets 230 to be adhered (e.g., by glue or other adhesives, welding, thermal bonding, etc.) to the corresponding radially innermost faces 240 and projection faces 242. However, it is most preferable that the baffle body 212, the latches 224, and the gussets 230 be integrally formed.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:
1. A motor for use in a machine, said motor comprising:
a rotor rotatable about an axis;
a stator including a core presenting axially opposite first and second core ends;
an electrical component for controlling at least one aspect of motor operation; and
a housing including a shell at least substantially circumscribing the stator,
said shell presenting first and second axial shell margins corresponding to said first and second core ends,
said first core end being disposed between said shell margins; and
a baffle including a generally radially extending, plate-like body and a baffle connection element,
said baffle including air-directing structure directing air toward said electrical component,
said body being disposed between said first core end and said first shell margin,
said body being disposed between said first core end and said electrical component,
said shell including a shell connection element,
interengagement of said connection elements at least substantially restricting axial shifting of the body toward the first shell margin.
2. The motor as claimed in claim 1,
interengagement of said connection elements additionally at least substantially restricting axial shifting of the body toward the first core margin.
3. The motor as claimed in claim 1,
said shell presenting an inner shell diameter,
said body presenting an outer body diameter that is less than or equal to the inner shell diameter.
4. The motor as claimed in claim 3,
said outer body diameter being less than the inner shell diameter.

5. The motor as claimed in claim 1,
said outer body diameter being about 0.015 inches less than the shell inner diameter.

6. The motor as claimed in claim 1,
a first one of said connection elements comprising a latch including—
    a resiliently deflectable elongated arm presenting a distal end, and
    a head extending from the arm adjacent the distal end thereof,
a second one of said connection elements comprising a receiver,
said receiver defining an opening configured to receive said head.

7. The motor as claimed in claim 6,
said arm extending at least substantially axially.

8. The motor as claimed in claim 7,
said arm having a generally axial arm length,
said head having a generally axial head height and defining an axially outermost margin of the latch,
said arm length being at least twice the head height.

9. The motor as claimed in claim 7,
said arm having a generally axial arm length,
said arm having a generally tangential arm width at least substantially orthogonal to the arm length,
said arm width being less than said arm length.

10. The motor as claimed in claim 7,
said arm having a generally radial arm thickness,
said arm including a first arm end spaced from the distal end,
said arm thickness decreasing from the first arm end to the second arm end.

11. The motor as claimed in claim 1,
a first one of said connection elements comprising a projecting positioner,
a second one of said connection elements comprising a receiver configured to receive at least part of the positioner.

12. The motor as claimed in claim 11,
said positioner extending from the body,
said shell defining the receiver.

13. The motor as claimed in claim 12,
said positioner comprising a latch including—
    a resiliently deflectable elongated arm presenting a distal end spaced from the body, and
    a head extending from the arm adjacent the distal end thereof,
said receiver defining an opening configured to receive said head.

14. The motor as claimed in claim 13,
said head including a guide face oriented obliquely relative to the shell,
said shell including a deflection face adjacent the first shell end,
said deflection face engaging said guide face upon initial insertion of the baffle into the shell to facilitate deflection of the arm and axial shifting of the baffle.

15. The motor as claimed in claim 14,
said guide face being oriented between about 30 degrees and about 50 degrees relative to the axis when the arm is in a non-deflected disposition.

16. The motor as claimed in claim 13,
said head including a generally radially extending catch face,
said receiver including a generally radially extending receiver face,
said catch face engaging said receiver face when the head is received by the receiver.

17. The motor as claimed in claim 13,
said head presenting a radially outermost margin of the baffle,
said radially outermost margin having an outermost margin diameter,
said body presenting an outer body diameter,
said shell presenting in inner shell diameter,
said outer body diameter being less than or equal to the inner shell diameter
said outermost margin diameter being greater than the inner shell diameter.

18. The motor as claimed in claim 1,
said air-directing structure comprising an airflow vent.

19. The motor as claimed in claim 1,
said baffle including wire-routing structure defining a gap for generally axial passage of wiring therethrough.

20. The motor as claimed in claim 1,
said baffle including a plurality of said baffle connection elements.

21. The motor as claimed in claim 20,
said baffle connection elements being unevenly arcuately spaced.

22. The motor as claimed in claim 21,
a first circumferential half of said baffle including a first pair of said baffle connection elements,
a second circumferential half of said baffle including a second pair of said baffle connection elements.

23. The motor as claimed in claim 1,
a first one of said connection elements comprising a latch including—
    a resiliently deflectable elongated arm presenting a distal end,
    a head extending from the arm adjacent the distal end thereof, and
    a reinforcing grommet extending at least in part along said arm,
a second one of said connection elements comprising a receiver,
said receiver defining an opening configured to receive said head.

* * * * *